US 8,488,751 B2

(12) United States Patent
Skakkebaek et al.

(10) Patent No.: US 8,488,751 B2
(45) Date of Patent: Jul. 16, 2013

(54) UNIFIED MESSENGING SYSTEM AND METHOD

(75) Inventors: Jens Ulrik Skakkebaek, San Carlos, CA (US); Cary W. FitzGerald, Palo Alto, CA (US)

(73) Assignee: Avaya Inc., Basking Ridge, NJ (US)

( * ) Notice: Subject to any disclaimer, the term of this patent is extended or adjusted under 35 U.S.C. 154(b) by 1545 days.

(21) Appl. No.: 11/801,882

(22) Filed: May 11, 2007

(65) Prior Publication Data

US 2008/0279350 A1 Nov. 13, 2008

(51) Int. Cl.
*H04M 11/00* (2006.01)

(52) U.S. Cl.
USPC ............... 379/88.13; 379/88.17; 379/88.22

(58) Field of Classification Search
USPC ............................... 379/88.13; 709/206
See application file for complete search history.

(56) References Cited

U.S. PATENT DOCUMENTS

| | | | |
|---|---|---|---|
| 1,113,631 A | 10/1914 | Hofmann et al. | |
| 5,029,199 A | 7/1991 | Jones et al. | |
| 5,345,501 A | 9/1994 | Shelton | |
| 5,568,540 A | 10/1996 | Greco et al. | |
| 5,572,578 A | 11/1996 | Lin et al. | |
| 5,647,002 A | 7/1997 | Brunson | |
| 5,703,942 A | 12/1997 | Pinard et al. | |
| 5,712,901 A | 1/1998 | Meermans | |
| 5,717,742 A | 2/1998 | Hyde-Thomson | |
| 5,742,668 A | 4/1998 | Pepe et al. | |
| 5,778,390 A | 7/1998 | Nelson et al. | |
| 5,845,203 A | 12/1998 | LaDue | |
| 5,903,627 A | 5/1999 | Shaffer et al. | |
| 5,909,483 A | 6/1999 | Weare et al. | |
| 5,915,001 A | 6/1999 | Uppaluru | |
| 5,946,386 A | 8/1999 | Rogers et al. | |
| 5,995,596 A | 11/1999 | Shaffer et al. | |
| 6,021,181 A | 2/2000 | Miner et al. | |
| 6,047,053 A | 4/2000 | Miner et al. | |
| 6,052,709 A | 4/2000 | Paul | |
| 6,070,081 A | 5/2000 | Takahashi et al. | |
| 6,072,862 A | 6/2000 | Srinivasan | |

(Continued)

FOREIGN PATENT DOCUMENTS

| | | |
|---|---|---|
| DE | 10338237 | 3/2005 |
| WO | WO 2006/086335 A2 | 8/2006 |
| WO | WO 2006/086335 A3 | 8/2006 |

OTHER PUBLICATIONS

Official Action for U.S. Appl. No. 11/053,411, mailed Mar. 16, 2010.

(Continued)

*Primary Examiner* — Simon Sing
*Assistant Examiner* — Van D Huynh
(74) *Attorney, Agent, or Firm* — Sheridan Ross P.C.

(57) ABSTRACT

Systems and methods for unified messaging are described herein. In an embodiment, a repository server includes a message store. According to one method implemented by the repository server, a voice message is sent as part of an email message. In an embodiment, preprocessing is performed before sending the email, including but not limited to inserting information, data, links, voice mail audio files, and voice mail transcriptions in the email. A copy of the preprocessed email is stored in the message store with an authentication key. The authentication key is used, for example by a recipient of the email, to access voice mail audio files that may not be accessible on the recipient's device.

42 Claims, 12 Drawing Sheets

U.S. PATENT DOCUMENTS

| | | | |
|---|---|---|---|
| 6,076,090 A | 6/2000 | Burroughs et al. | |
| 6,085,231 A | 7/2000 | Agraharam et al. | |
| 6,138,209 A | 10/2000 | Krolak et al. | |
| 6,163,794 A | 12/2000 | Lange et al. | |
| 6,181,780 B1 | 1/2001 | Finnigan | |
| 6,212,265 B1 | 4/2001 | Duphorne | |
| 6,233,318 B1 | 5/2001 | Picard et al. | |
| 6,253,206 B1 | 6/2001 | Burton et al. | |
| 6,275,570 B1 | 8/2001 | Homan et al. | |
| 6,304,636 B1 | 10/2001 | Goldberg et al. | |
| 6,317,484 B1 | 11/2001 | McAllister | |
| 6,317,485 B1 | 11/2001 | Homan et al. | |
| 6,324,265 B1 | 11/2001 | Christie, IV et al. | |
| 6,339,776 B2 | 1/2002 | Dayani-Fard et al. | |
| 6,351,523 B1 | 2/2002 | Detlef | |
| 6,389,115 B1 | 5/2002 | Swistock | |
| 6,389,276 B1 | 5/2002 | Brilla et al. | |
| 6,396,907 B1 | 5/2002 | Didcock | |
| 6,396,908 B1 | 5/2002 | O'Donovan et al. | |
| 6,405,035 B1 | 6/2002 | Singh | |
| 6,411,685 B1 | 6/2002 | O'Neal | |
| 6,434,222 B1 | 8/2002 | Shaffer et al. | |
| 6,438,215 B1 | 8/2002 | Skladman et al. | |
| 6,493,431 B1 | 12/2002 | Troen-Krasnow et al. | |
| 6,501,750 B1 | 12/2002 | Shaffer et al. | |
| 6,519,327 B1 | 2/2003 | Cannon et al. | |
| 6,519,571 B1 | 2/2003 | Guheen et al. | |
| 6,524,274 B1 | 2/2003 | Rosenthal et al. | |
| 6,526,274 B1 | 2/2003 | Fickes et al. | |
| 6,549,612 B2 | 4/2003 | Gifford et al. | |
| 6,553,563 B2 | 4/2003 | Ambrose et al. | |
| 6,563,912 B1 * | 5/2003 | Dorfman et al. | 379/88.13 |
| 6,587,871 B1 | 7/2003 | Schrader | |
| 6,618,763 B1 | 9/2003 | Steinberg | |
| 6,629,138 B1 | 9/2003 | Lambert et al. | |
| 6,671,800 B1 | 12/2003 | McInally et al. | |
| 6,683,940 B2 | 1/2004 | Contractor | |
| 6,714,778 B2 | 3/2004 | Nykanen et al. | |
| 6,721,398 B1 | 4/2004 | Pitcher | |
| 6,725,205 B1 | 4/2004 | Weiler et al. | |
| 6,731,927 B1 | 5/2004 | Stern et al. | |
| 6,785,367 B2 | 8/2004 | Horvath et al. | |
| 6,832,373 B2 | 12/2004 | O'Neill | |
| 6,853,714 B2 | 2/2005 | Liljestrand et al. | |
| 6,871,346 B1 | 3/2005 | Kumbalimutt et al. | |
| 6,937,724 B1 | 8/2005 | Kozdon et al. | |
| 6,947,989 B2 | 9/2005 | Gullotta et al. | |
| 6,950,502 B1 | 9/2005 | Jenkins | |
| 6,950,990 B2 | 9/2005 | Rajarajan et al. | |
| 6,952,558 B2 | 10/2005 | Hardacker | |
| 6,957,186 B1 | 10/2005 | Guheen et al. | |
| 6,996,413 B2 | 2/2006 | Inselberg | |
| 7,054,905 B1 * | 5/2006 | Hanna et al. | 709/206 |
| 7,068,668 B2 | 6/2006 | Feuer | |
| 7,072,934 B2 | 7/2006 | Helgeson et al. | |
| 7,082,469 B2 | 7/2006 | Gold et al. | |
| 7,092,504 B1 | 8/2006 | Buller | |
| 7,136,461 B1 | 11/2006 | Swingle et al. | |
| 7,136,865 B1 | 11/2006 | Ra et al. | |
| 7,151,823 B2 | 12/2006 | Durkin | |
| 7,167,550 B2 | 1/2007 | Klos et al. | |
| 7,203,288 B1 | 4/2007 | Dwyer et al. | |
| 7,222,156 B2 | 5/2007 | Gupta et al. | |
| 7,281,269 B1 | 10/2007 | Sievers et al. | |
| 7,317,788 B2 | 1/2008 | Caspi et al. | |
| 7,321,655 B2 | 1/2008 | Skakkebaek et al. | |
| 7,330,537 B2 | 2/2008 | Frifeldt et al. | |
| 7,346,150 B2 | 3/2008 | Frifeldt et al. | |
| 7,373,607 B2 | 5/2008 | Daniell | |
| 7,379,540 B1 | 5/2008 | Van Gundy | |
| 7,409,425 B2 * | 8/2008 | Naick et al. | 709/206 |
| 7,519,984 B2 | 4/2009 | Bhogal et al. | |
| 7,564,954 B2 | 7/2009 | Frifeldt et al. | |
| 7,574,477 B2 * | 8/2009 | Nagai | 709/206 |
| 7,680,820 B2 | 3/2010 | Denoue et al. | |
| 7,693,267 B2 | 4/2010 | Howell et al. | |
| 2002/0032752 A1 | 3/2002 | Gold et al. | |
| 2002/0049749 A1 | 4/2002 | Helgeson et al. | |
| 2002/0064149 A1 | 5/2002 | Elliott et al. | |
| 2002/0115454 A1 | 8/2002 | Hardacker | |
| 2002/0123331 A1 | 9/2002 | Lehaff et al. | |
| 2002/0123342 A1 | 9/2002 | Lehaff et al. | |
| 2002/0131573 A1 | 9/2002 | Berkley et al. | |
| 2002/0143877 A1 | 10/2002 | Hackbarth et al. | |
| 2002/0147801 A1 | 10/2002 | Gullotta et al. | |
| 2002/0165986 A1 | 11/2002 | Tarnoff | |
| 2002/0169876 A1 | 11/2002 | Curie et al. | |
| 2002/0188453 A1 | 12/2002 | Hirschberg et al. | |
| 2003/0028603 A1 | 2/2003 | Aktas et al. | |
| 2003/0046421 A1 | 3/2003 | Horvitz et al. | |
| 2003/0050046 A1 | 3/2003 | Conneely et al. | |
| 2003/0123622 A1 * | 7/2003 | Gifford et al. | 379/88.13 |
| 2003/0128820 A1 | 7/2003 | Hirschberg et al. | |
| 2003/0140112 A1 | 7/2003 | Ramachandran et al. | |
| 2003/0195934 A1 | 10/2003 | Peterson et al. | |
| 2003/0220784 A1 | 11/2003 | Fellenstein et al. | |
| 2003/0220975 A1 | 11/2003 | Malik | |
| 2004/0002325 A1 | 1/2004 | Evans et al. | |
| 2004/0019644 A1 | 1/2004 | Fellenstein et al. | |
| 2004/0022379 A1 | 2/2004 | Klos et al. | |
| 2004/0039786 A1 | 2/2004 | Horvitz et al. | |
| 2004/0044687 A1 | 3/2004 | Vachuska et al. | |
| 2004/0044989 A1 | 3/2004 | Vachuska et al. | |
| 2004/0049696 A1 | 3/2004 | Baker et al. | |
| 2004/0062368 A1 | 4/2004 | Durkin | |
| 2004/0064317 A1 | 4/2004 | Othmer et al. | |
| 2004/0064502 A1 | 4/2004 | Yellepeddy et al. | |
| 2004/0109544 A1 | 6/2004 | Didcock et al. | |
| 2004/0111702 A1 | 6/2004 | Chan | |
| 2004/0120480 A1 | 6/2004 | Didcock et al. | |
| 2004/0121761 A1 | 6/2004 | Tripathy et al. | |
| 2004/0146144 A1 | 7/2004 | Xiaofeng et al. | |
| 2004/0171381 A1 | 9/2004 | Inselberg | |
| 2004/0186861 A1 | 9/2004 | Phatak | |
| 2004/0199587 A1 | 10/2004 | McKnight | |
| 2004/0225525 A1 | 11/2004 | Weitzman | |
| 2004/0253956 A1 | 12/2004 | Collins | |
| 2004/0258231 A1 | 12/2004 | Elsey et al. | |
| 2004/0267768 A1 | 12/2004 | Harjanto | |
| 2005/0013419 A1 | 1/2005 | Pelaez et al. | |
| 2005/0018821 A1 | 1/2005 | Darsin et al. | |
| 2005/0025297 A1 | 2/2005 | Finnigan | |
| 2005/0091226 A1 | 4/2005 | Lin et al. | |
| 2005/0132266 A1 | 6/2005 | Ambrosino et al. | |
| 2005/0216421 A1 | 9/2005 | Barry et al. | |
| 2006/0031340 A1 | 2/2006 | Mathew et al. | |
| 2006/0059107 A1 | 3/2006 | Elmore et al. | |
| 2006/0072720 A1 | 4/2006 | Blohm | |
| 2006/0177005 A1 | 8/2006 | Shaffer et al. | |
| 2006/0177007 A1 | 8/2006 | Vaghar et al. | |
| 2006/0177008 A1 | 8/2006 | Forney et al. | |
| 2006/0177009 A1 | 8/2006 | Skakkebaek et al. | |
| 2006/0177011 A1 | 8/2006 | Skakkebaek et al. | |
| 2006/0177012 A1 | 8/2006 | Forney et al. | |
| 2006/0177014 A1 | 8/2006 | Skakkebaek et al. | |
| 2006/0177015 A1 | 8/2006 | Skakkebaek et al. | |
| 2006/0177023 A1 | 8/2006 | Vaghar et al. | |
| 2006/0177024 A1 | 8/2006 | Frifeldt et al. | |
| 2006/0223502 A1 | 10/2006 | Doulton | |
| 2006/0234680 A1 | 10/2006 | Doulton | |
| 2006/0274856 A1 | 12/2006 | Dunn et al. | |
| 2007/0005713 A1 | 1/2007 | LeVasseur et al. | |
| 2007/0127638 A1 | 6/2007 | Doulton | |
| 2007/0174388 A1 | 7/2007 | Williams | |
| 2008/0133548 A1 | 6/2008 | Skakkebaek et al. | |
| 2008/0175235 A1 | 7/2008 | Frifeldt et al. | |
| 2008/0198979 A1 | 8/2008 | Skakkebaek et al. | |
| 2008/0198980 A1 | 8/2008 | Skakkebaek et al. | |
| 2008/0198981 A1 | 8/2008 | Skakkebaek et al. | |
| 2010/0184409 A1 | 7/2010 | Doulton | |

OTHER PUBLICATIONS

Official Action for U.S. Appl. No. 12/016,350, mailed Dec. 29, 2009.
Official Action for U.S. Appl. No. 11/053,271, mailed Dec. 1, 2009.
Official Action for U.S. Appl. No. 11/053,147, mailed Dec. 9, 2009.
Official Action for U.S. Appl. No. 11/053,411, mailed Sep. 30, 2009.

Final Official Action for U.S. Appl. No. 12/016,365, mailed Oct. 13, 2009.
Official Action for U.S. Appl. No. 11/053,270, mailed Dec. 11, 2009.
Extended European Search Report for European Patent Application No. 08705860.8, dated Nov. 24, 2010.
Official Action for U.S. Appl. No. 11/053,054, mailed Dec. 29, 2010.
U.S. Appl. No. 13/022,770, Skakkebaek et al. (filed Feb. 8, 2011).
Official Action for U.S. Appl. No. 11/053,147, mailed Jun. 25, 2010.
Official Action for U.S. Appl. No. 12/016,350, mailed Jun. 30, 2010.
Official Action for U.S. Appl. No. 11/053,054, mailed Jun. 7, 2010.
"Introducing Adomo MCS Voice Access to Microsoft Outlook/Exchange," Adomo, Inc., http://support.adomo.com/3.1/user/, for Sep. 2003 release.
"Administrator's Guide", Adomo, Inc., http://support.adomo.com/3.1/adminguide/, for Sep. 2003 release.
AdomoMCS, Mobile Communication Server™, Adomo Inc., undated, 2 pages.
CMP Media LLC, "Adomo Launches Mobile Communications Server," Computer Telephony, Apr. 2001.
International Search Report for International (PCT) Application No. PCT/US08/50835, mailed Mar. 31, 2008.
Written Opinion for International (PCT) Application No. PCT/US08/50835, mailed Mar. 31, 2008.
International Preliminary Report on Patentability for International (PCT) Application No. PCT/US08/50835, issued Aug. 26, 2009.
International Search Report for International (PCT) Application No. PCT/US2008/050840, mailed Apr. 15, 2008.
Written Opinion for International (PCT) Application No. PCT/US2008/050840, mailed Apr. 15, 2008.
International Preliminary Report on Patentability for International (PCT) Application No. PCT/US2008/050840, Issued Aug. 26, 2009.
International Search Report for International (PCT) Application No. PCT/US2008/050842, mailed Apr. 30, 2008.
Written Opinion for International (PCT) Application No. PCT/US2008/050842, mailed Apr. 30, 2008.
International Preliminary Report on Patentability for International (PCT) Application No. PCT/US2008/050842, issued Aug. 26, 2009.
Official Action for U.S. Appl. No. 11/053,376, mailed Jul. 19, 2006.
Official Action for U.S. Appl. No. 11/053,376, mailed Apr. 5, 2007.
Official Action for U.S. Appl. No. 11/053,376, mailed Nov. 16, 2007.
Official Action for U.S. Appl. No. 11/053,376, mailed Sep. 5, 2008.
Official Action for U.S. Appl. No. 11/053,539, mailed Aug. 11, 2006.
Official Action for U.S. Appl. No. 11/053,539, mailed May 14, 2007.
Official Action for U.S. Appl. No. 11/053,538, mailed Jul. 6, 2006.
Official Action for U.S. Appl. No. 11/053,538, mailed Mar. 22, 2007.
Official Action for U.S. Appl. No. 11/053,538, mailed Nov. 27, 2007.
Official Action for U.S. Appl. No. 11/053,736, mailed Aug. 19, 2008.
Official Action for U.S. Appl. No. 11/053,271, mailed Apr. 3, 2008.
Official Action for U.S. Appl. No. 11/053,271, mailed Jan. 7, 2009.
Official Action for U.S. Appl. No. 11/053,147, mailed Apr. 3, 2009.
Official Action for U.S. Appl. No. 11/053,411, mailed Apr. 23, 2008.
Official Action for U.S. Appl. No. 11/053,411, mailed Dec. 31, 2008.
Official Action for U.S. Appl. No. 12/016,350, mailed Apr. 29, 2009.
Official Action for U.S. Appl. No. 12/016,365, mailed Nov. 10, 2008.
Official Action for U.S. Appl. No. 11/053,054, mailed Jun. 28, 2006.
Official Action for U.S. Appl. No. 11/053,054, mailed Nov. 15, 2007.
Official Action for U.S. Appl. No. 11/053,054, mailed Jun. 3, 2008.
Official Action for U.S. Appl. No. 11/053,054, mailed May 26, 2009.
Official Action for U.S. Appl. No. 11/053,425, mailed Jul. 10, 2008.
Official Action for U.S. Appl. No. 11/053,425, mailed Apr. 13, 2009.
Official Action for U.S. Appl. No. 11/053,270, mailed Apr. 3, 2009.
Official Action for U.S. Appl. No. 11/053,054, mailed Mar. 21, 2007.
Official Action (including translation) for Chinese Patent Application No. 200880012076.9, dated Mar. 21, 2011.
Official Action for U.S. Appl. No. 11/709,475, mailed May 31, 2011.
Official Action for U.S. Appl. No. 11/709,513, mailed Jun. 13, 2011.
Official Action for U.S. Appl. No. 11/053,411, mailed Sep. 20, 2010.
Notice of Allowability for U.S. Appl. No. 12/016,350, mailed Nov. 9, 2010.
Notice of Allowability for U.S. Appl. No. 12/016,365, mailed Sep. 16, 2010.
Notice of Allowance for U.S. Appl. No. 11/053,425, mailed Jan. 4, 2010.
Notice of Allowability for U.S. Appl. No. 11/053,271, mailed Jun. 3, 2010.
Official Action for U.S. Appl. No. 12/016,350, mailed Mar. 24, 2010.
Official Action for U.S. Appl. No. 12/016,365, mailed Mar. 29, 2010.

* cited by examiner

UNIFIED MESSAGING SYSTEM AND METHOD

The disclosure herein relates generally to multimedia messaging systems and methods, and more particularly to systems that enable integrated voicemail and email functionality.

BACKGROUND

Currently it is possible to receive emails on a mobile phone device, such as a BlackBerry®. It is also possible to receive notification of voicemails via email on any email capable device. In some systems, email notification includes a playable audio file (such as a WAV file, for example) of the message so the user may hear the message without calling in to a voicemail system. This voicemail/email integration is available to individual users through commercial providers who may redirect voice callers from the user's "old" phone number to their system. Alternatively, some providers give the user a different number to be used for voicemail-to-email processing. In addition, complete integration of communication media within an enterprise is available from Adomo, Inc. For example, the Adomo "Unified Communications" solutions integrate tightly with existing enterprise communications and data management systems to provide employees with seamless access to messages of all types on all devices, no matter where the employee are physically located.

However, some capabilities are lacking in conventional solutions. For example, when sending a voice message via email, the recipient's email system may strip or block the audio attachment. Currently, when emails with voice messages are sent between email servers on distinct systems, the recipient who fails to receive an audio attachment has no way to listen to the voice message. In addition, it is currently not possible for a recipient of a voice message in an email to respond with a voice message unless the recipient's device includes a recorder.

INCORPORATION BY REFERENCE

All publications and patent applications mentioned in this specification are herein incorporated by reference to the same extent as if each individual publication or patent application was specifically and individually indicated to be incorporated by reference.

Figure 1:
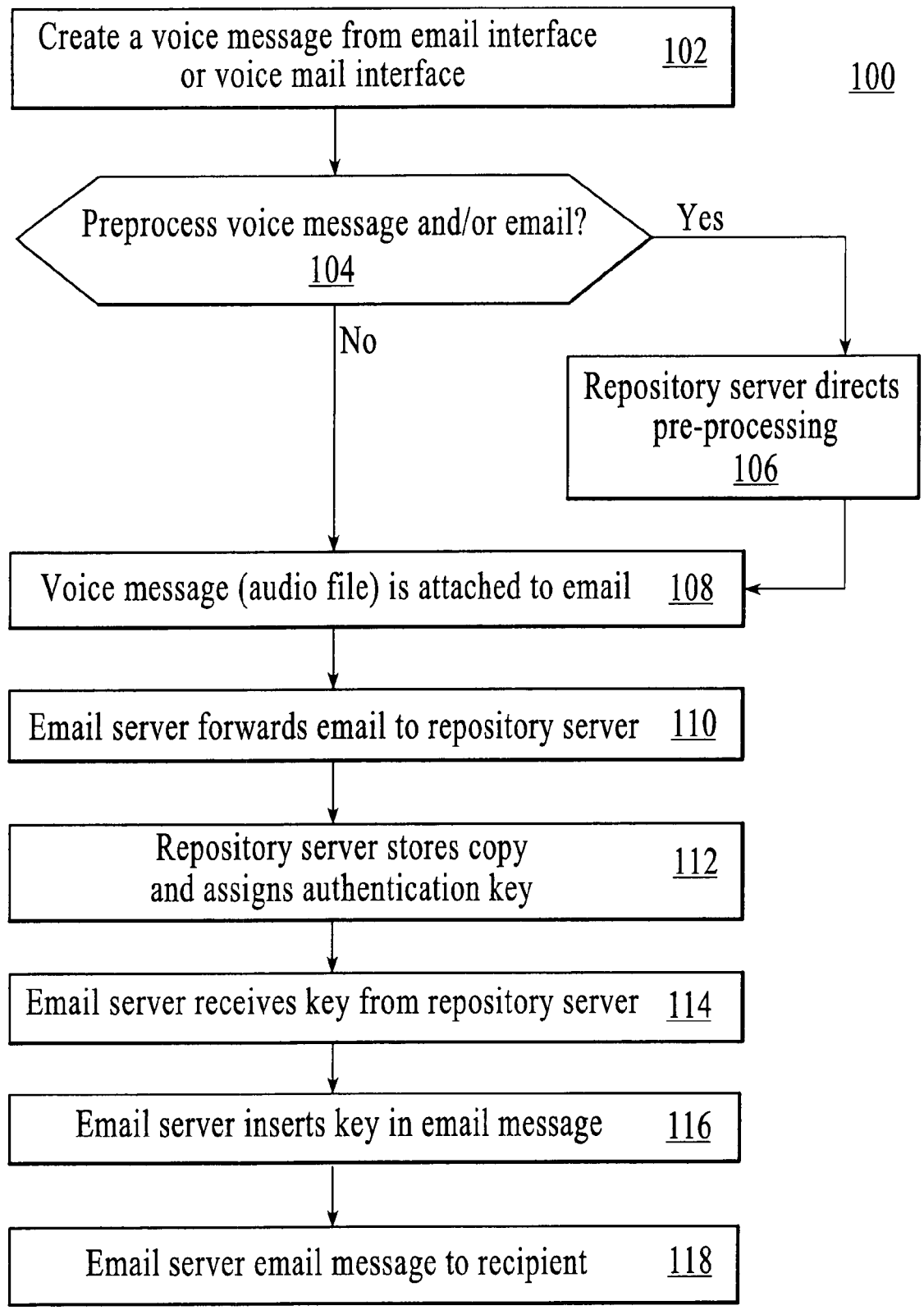
FIG. 1 is a flow diagram of a unified messaging method, according to an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 110 is first introduced and discussed with respect to FIG. 1).

DETAILED DESCRIPTION

Systems and methods for unified messaging are described herein. According to various embodiments, a repository server is coupled to an email server and a public switched telephone network (PSTN). The repository server is configurable to facilitate and manage voice and data communications for a user. In an embodiment, voice messages are included as attachments in email messages to be sent to recipients. In an embodiment, voice messages and/or email messages are pre-processed, including inserting information and/or media in email messages, and attaching or inserting transcriptions of voice messages in email messages to be sent to recipients. In further embodiments, a recipient of an email message listens to an attached voice message on a recipient email-capable device. A recipient may also request, through the repository server, to listen to the voice message on a separate phone device. This is useful when the actual audio file of the voice message is stripped by the recipient's email system, for example. The repository server also facilitates responding to voice messages and email messages. In an embodiment, a recipient records a voice response that is attached to a response email by the repository server, and transmitted to the original sender in the response email. In an embodiment, the repository server includes a message store that stores copies of email messages and attachments, such as audio files. Storage includes an authentication mechanism such as a unique key that is presented to access a stored item. In an embodiment, storage occurs when a message is initiated by a user sending a new email message. If a recipient or sender later requests access to the message, for example to play an attached audio file, the audio file is made available upon successful authentication of the requester.

FIG. 1 is a flow diagram of a unified messaging method 100, according to an embodiment. Method 100 includes creating and sending an email that includes a voice message. At 102, a voice message is created from an email interface or voice mail interface. The voice message is created by the sender recording an audio file of the voice message. The sender may create the audio file by speaking into a phone. Alternatively, the user may create the audio file from an email interface by choosing a particular option or command and speaking into a microphone of the user's email-capable device. At 104 it is determined whether the voice mail and/or the email are to be preprocessed. As further described below, preprocessing can be chosen by the user in response to a query or prompt, or may automatically according to previously set preferences.

If the voice message and/or the email message is to be preprocessed, a repository server, as further described below, directs the preprocessing at 106. In various embodiments, the repository server facilitates the methods described herein. The repository server in an embodiment is coupled among communications networks so as to act as an intermediary between a user's email server(s) and the communication network that transmits the user's voice and data communications. In other embodiments, the repository server is coupled among communications networks so as to act as an intermediary between an enterprise email server and the communications network that transmits the enterprise user's voice and data communications.

Preprocessing, for example, may include obtaining a transcription of the voice message. Preprocessing may further include modifying the email to include certain text, graphics, or attachments as previously specified by a user. As an example, in an enterprise system in which user preferences are set for email behavior and access is available to enterprise user information, specific email preprocessing or modification could be specified for particular recipients.

At 108, the audio file of the voice message is attached to the email, whether or not any preprocessing took place. The audio file in an embodiment is a Waveform audio format file ("WAV file") that is an attachment to the email. In alternative embodiments, the audio file is embedded in a container, such as a Flash attachment. Macromedia Flash software and Macromedia Flash player are products of Adobe Systems, Inc. An email server forwards the email to the repository server at 110. The repository server stores a copy of the email, with any pre-processing or attachments at 112, and also assigns an authentication key. The authentication key can include any known authentication method used to authenticate a requester requesting access to a uniquely identified, stored data item. For example, the authentication key may be a combination of a user identification (ID) and a password, but embodiments are not so limited.

The authentication key is received by the email server from the repository server at 114. The mail server inserts the authentication key in the email message at 116. In an embodiment, the authentication key is part of a uniform resource locator ("URL"). Alternatively, the authentication key is embedded in a Flash file that displays a button for the user to press. In any case, the authentication key provides a pointer to the associated message stored in the repository server.

At 118, the email server sends the email message, including the authentication key, results of any pre-processing and any attachments, to the recipient.

Figure 2:
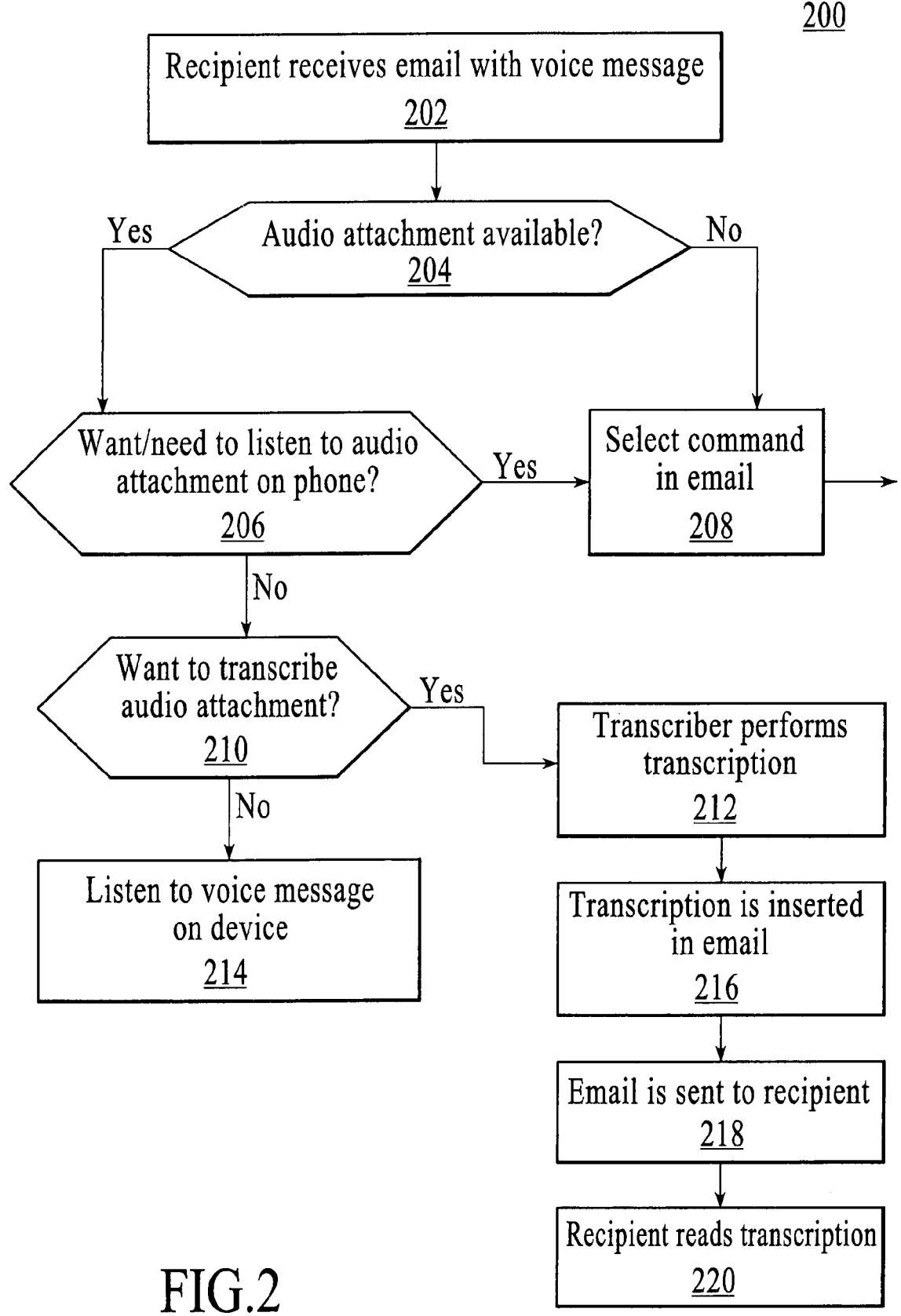
FIG. 2 is a flow diagram of a unified messaging method, according to an embodiment.

FIG. 2 is a flow diagram of a unified messaging method 200, according to an embodiment. Method 200 includes receiving an email and recipient options. At 202, the recipient receives the email that was sent in accordance with method 100. The recipient receives the email on an email-capable device, such as a personal computer ("PC") or a handheld device. It is determined whether an audio attachment is available at 204. In some instances, the audio attachment that was sent with the email may not be available because the recipient's email system has stripped or blocked the attachment for security reasons. As further explained below, the recipient may choose to listen to the audio file on a phone by selecting a command at 208.

If the audio attachment is available, the recipient is presented with an option to listen to the audio attachment on a recipient phone. The recipient may wish to listen to the audio attachment on a phone rather than on the email-capable receiving device, for privacy reasons or other reasons.

If the recipient does not opt to listen to the audio attachment on a phone, the recipient is given an option to have the audio attachment transcribed at 210. If the recipient does not wish to have the audio attachment transcribed, the audio attachment is played for the recipient. The recipient listens to the voice message on the recipient's email-capable device at 214.

If the recipient chooses at 210 to have the audio attachment transcribed, a transcriber performs a transcription at 212. Transcription is performed in an embodiment, as directed or controlled by the repository server. Transcription may actually occur anywhere. Transcription can be performed by a machine provided with the audio attachment, or by a human provided with the audio attachment. For example, mechanisms of obtaining audio file transcriptions as described in the following copending U.S. Patent Applications are applicable to the methods and systems describe herein:

U.S. patent application Ser. No. 11/709,475, titled Voicemail Filtering and Transcription System, filed Feb. 21, 2007;

U.S. patent application Ser. No. 11/709,542, titled Voicemail Filtering and Transcription System, filed Feb. 21, 2007; and U.S. patent application Ser. No. 11/709,513, titled Voicemail Filtering and Transcription System, filed Feb. 21, 2007.

The transcription is inserted in the email at 216. The insertion can include attaching a text file of the transcription, or alternatively, inserting the transcription text in the body of the email. The email with the transcription is sent to the requesting recipient at 218. The transcription is then available for the recipient to read as shown at 220.

Referring again to 204 and 206, if either the audio attachment is not available and/or the recipient wishes to listen to the audio attachment on a phone, the recipient may select a command from the recipient's email-capable device as shown at 208. The command is a request to listen to the audio file on a phone.

The method illustrated with reference to FIG. 2 is one embodiment of several possible embodiments. The order of events may be different in alternative embodiments. For example, after it is determined whether an audio attachment is available at 204, transcription could occur before, or after, or instead of listening to the audio attachment. A prompt or query at 206 could be a prompt for the user to select one of several courses of action including requesting a transcription, listening to the audio attachment, responding to the email, doing nothing, etc. All such variations are within the scope of the embodiments described and claimed herein.

Figure 3:
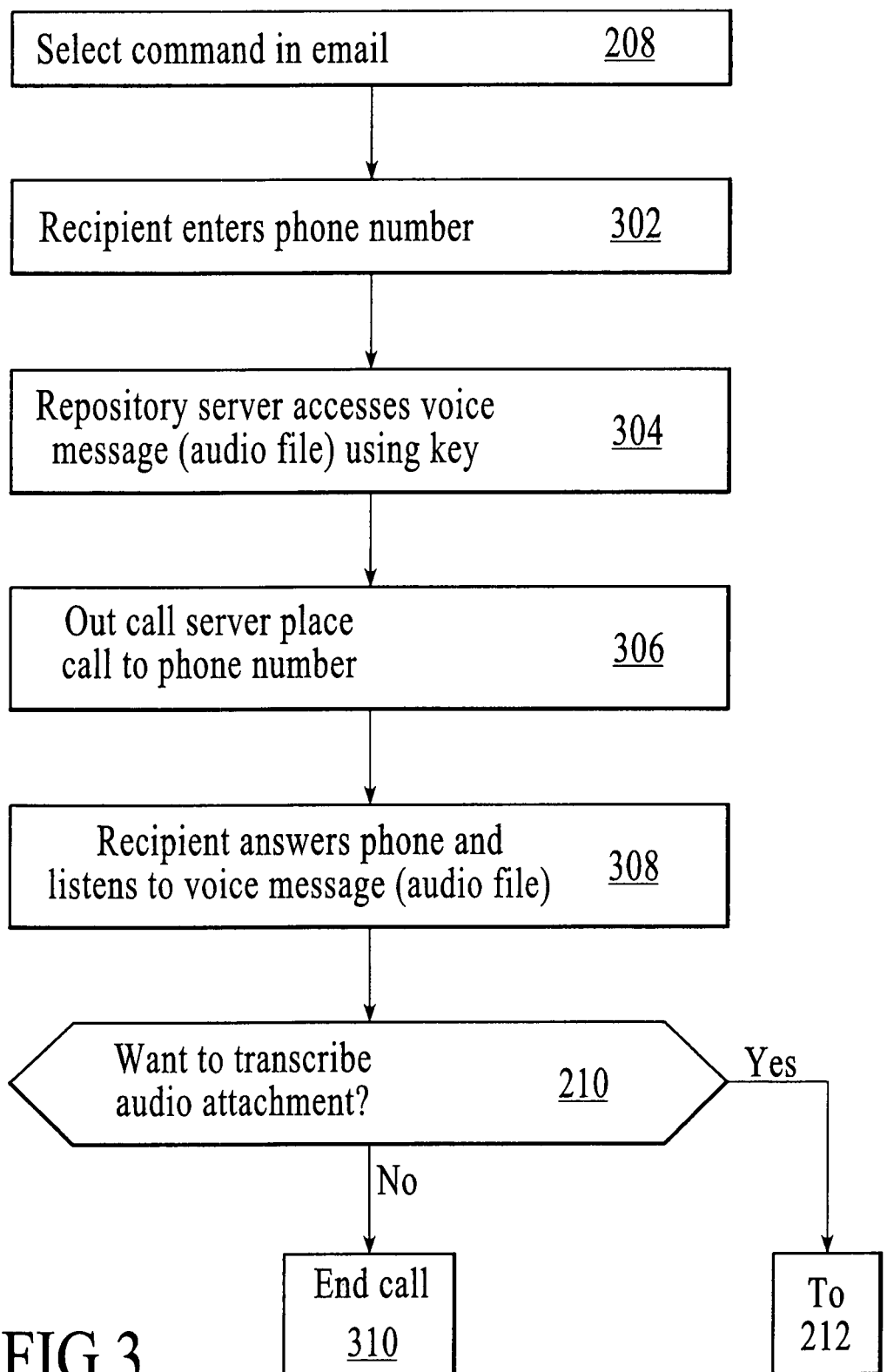
FIG. 3 is a flow diagram of a method including a listen-on-phone option for a recipient, according to an embodiment.

FIG. 3 is a flow diagram of a method 300 according to an embodiment. The method 300 includes facilitating a listen-on-phone option for the recipient. Method 300 is invoked when the recipient selects the command in the mail as shown at 208 in FIG. 3. The recipient is then prompted to enter a phone number on which to hear the audio attachment. The recipient enters the phone number at 302.

The repository server accesses the audio attachment (also referred to herein as the voice message and the audio file) from the message store using the authentication key as shown at 304. In an embodiment, the repository server receives the authentication key from the email, but embodiments are not so limited. In an embodiment, as further described below, an out-call server places a call to the phone number at 306. The recipient answers this phone call at 308 and listens to the voice message on the phone call. In an embodiment, the recipient is given the option to have the audio attachment transcribed at 210 (as previously shown in FIG. 2). If the recipient does not wish to have the audio attachment transcribed, the phone call ends at 310. If the recipient does wish to have the audio attachment transcribed, the process returns to 212 through 220 as shown in FIG. 2.

Figure 4:
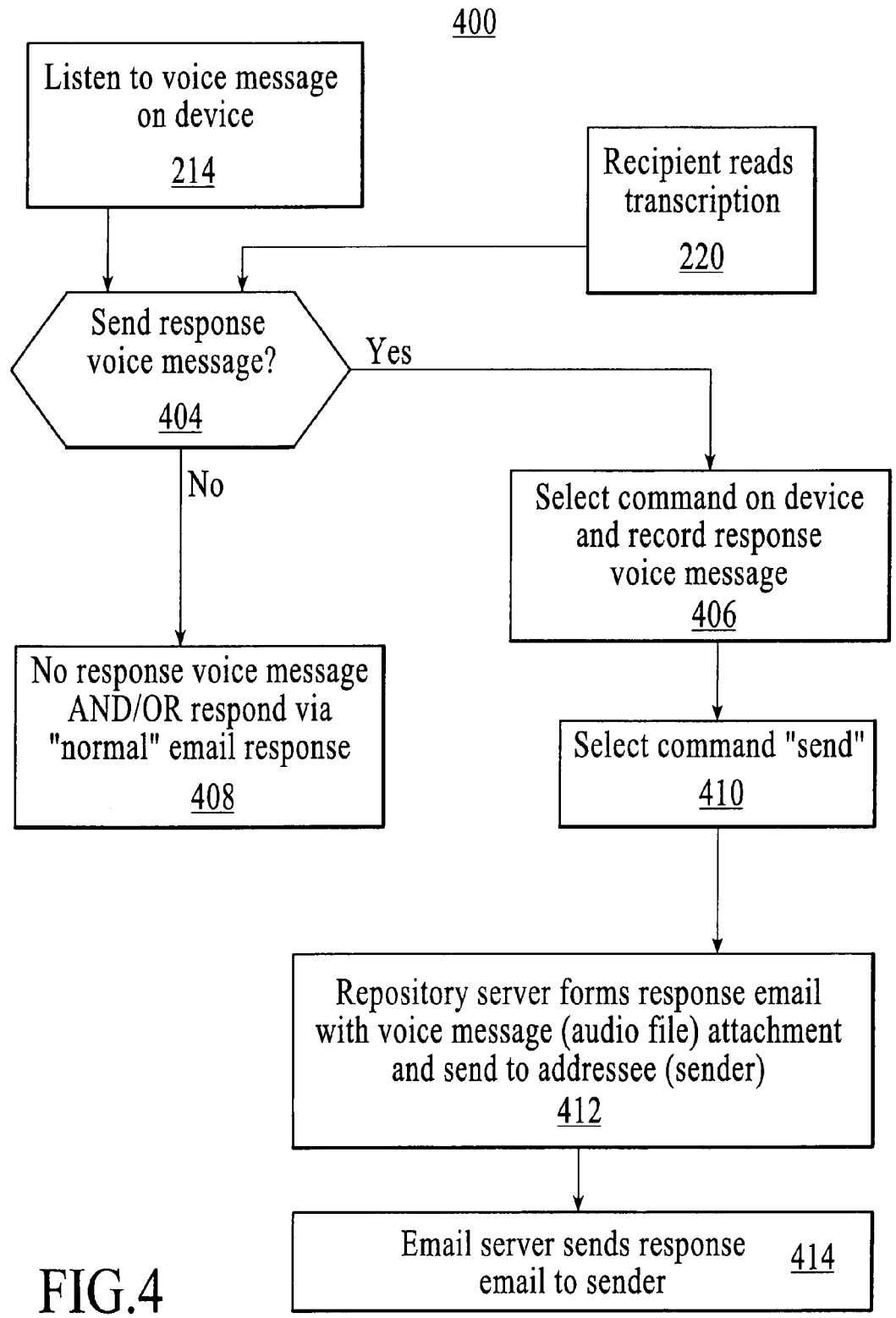
FIG. 4 is a flow diagram of a method including replying to an email message, according to an embodiment.

FIG. 4 is a flow diagram of a method 400 according to an embodiment. The method 400 includes the recipient replying to the email message received by the recipient according to the previously described figures. As previously described with reference to 214, the recipient may listen to the voice message on the email-capable device. In addition, as previously described with reference to 220, the recipient may read the transcription on the email-capable device. In either of these situations, the recipient is given an option to send a response voice message to the voice message at 404.

If the recipient chooses not to respond to the voice message, as shown at 408, no response voice message is sent and/or the recipient may respond via "normal" email response by creating an email to the sender of the voice message.

If the recipient chooses at 404 to send a response voice message, the recipient selects a command on the recipient email-capable device to record a response voice message at 406. When the recipient has spoken the response voice message into the device, a "Send" command is selected by the recipient at 410. The repository server forms a response email at 412 that includes the response voice message as an audio file attachment. An email server sends the response email to the sender at 414. In various embodiments, the repository server has access to the recipient and sender information from the copy of the email in the message store. The response email is formed and the sender becomes the addressee. In various embodiments, the email server and the repository server may be the same server or different servers. In various other embodiments, a response to sent to the sender via phone.

Figure 5:
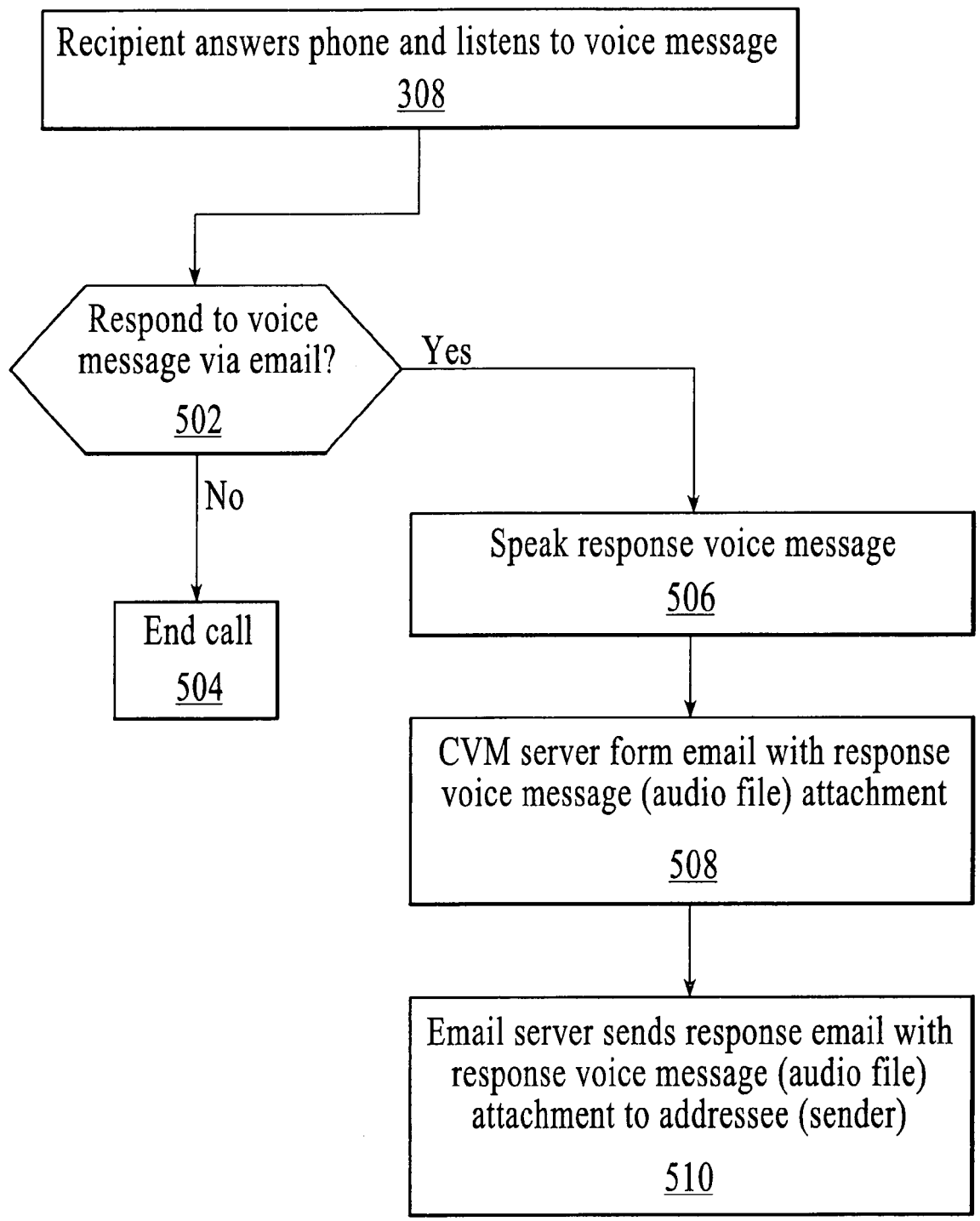
FIG. 5 is a flow diagram of a method including the recipient replying to the voice message listened to by the recipient on a phone, according to an embodiment.

FIG. 5 is a flow diagram of a method 500 according to an embodiment. The method 500 includes the recipient replying to the voice message listened to by the recipient on a phone, as previously described. In particular, method 500 includes the recipient replying with a response voice message via the phone. From 308, at which the recipient answers the phone and listens to the voice message, the recipient is given an option to respond to the voice message at 502. If the recipient chooses not to respond the call ends at 504.

If the recipient chooses to respond to the voice message, the recipient speaks the response voice message into the phone at 506. In an embodiment, a create-voice-message ("CVM") server forms a response email that includes the response voice message as an audio file attachment at 508. At 510, the email server sends the response email with the response voice mail to the addressee, who is the sender. In an embodiment, the CVM is a part of the repository server and has the same access to stored copies of the email messages for purposes of determining addressees, etc. In an embodiment, the repository server is also the email server, but the claimed invention is not so limited.

Figure 6:
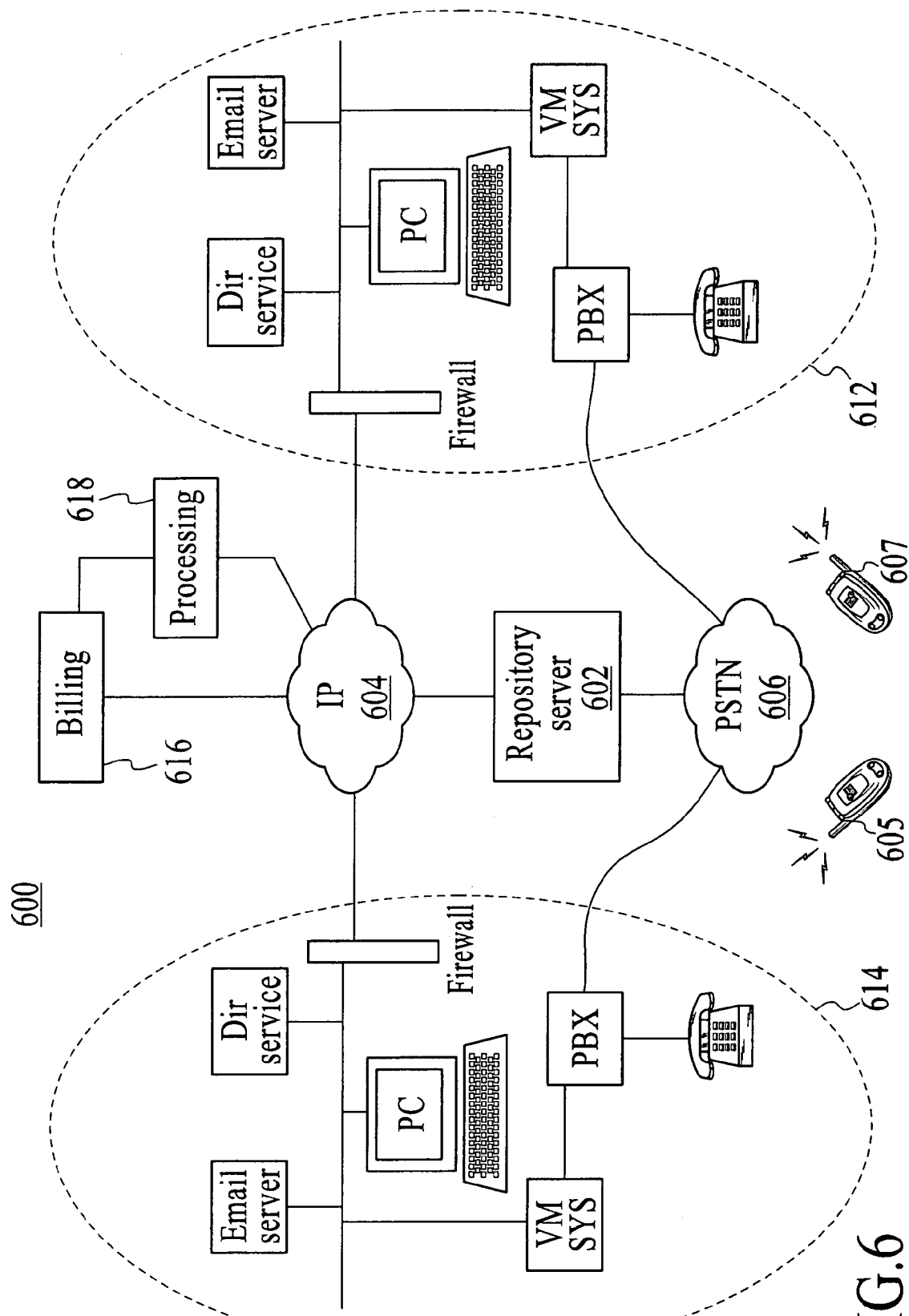
FIG. 6 is a block diagram of a unified messaging system, according to an embodiment.

FIGS. 6-12 are diagrams illustrating examples of systems, apparatus and data structures for implementing the methods described with reference to FIGS. 1-5. FIG. 6 is a block diagram of a system 600, according to an embodiment. System 600 includes a repository server 602 coupled among an internet protocol ("IP") network 604 and a public switched telephone ("PSTN") network 606. Mobile communication devices are coupled to IP network 604 and PSTN 606. As an example, sender device 607 and recipient device 605 are shown. In various embodiments, a sender device and/or a recipient device may also include a personal computer with communication capabilities as described herein. Any user device that communicates via any or all of the communication networks or methods described is appropriate to the embodiments.

A user network 612 and a user network 614 are each coupled to IP network 604 and PSTN 606. Two user networks are shown as an example, but any number of user networks could be coupled as shown. As used herein, a user network infers devices and personal or enterprise local area networks or wide area networks that are specific to a sender and/or a recipient. For example, each of networks 612 and 614 include an email server, a voice mail system, a directory service, a personal computer, and a personal branch exchange ("PBX"), but embodiments are not so limited. Embodiment can also include a unified messaging system. In the example of FIG. 6, the networks 612 and 614 are configured as enterprise networks, but alternative embodiments include a single user environment with a simple firewall, no email server, no voice mail, and no directory service.

In an embodiment, a billing component 616 is accessible via IP network 604. Billing component 616 is a system for determining appropriate parties to bill for services provided according to methods described herein. For example, a transcription requested by a recipient might be billed to the sender or the recipient. Information regarding the party to be billed can be included in the original email sent by the sender. Alternatively, the recipient can be informed that a transcription will be billed to the recipient if requested in response to a query. In any case, billing component 604 provides a data collection and dissemination facility that is accessible to billing parties. In an embodiment (not shown), billing component 616 is part of repository server 602, or part of one of the networks 612 and/or 614.

A processing module 618 is shown coupled to IP network 604 and billing component 616. Processing module 618 provides some or all of the preprocessing as previously described (e.g., with reference to FIG. 1). For example, processing module 618 provides transcriptions and and/or Flash applications in an embodiment. In various other embodiments, some or all of the processing 618 module capability is contained within repository server 602. Alternatively, the processing 618 module capability is distributed unpredictably over one or more networks and accessed via IP network 604.

In other embodiments, repository server 602 is itself part of an enterprise messaging application in an enterprise. For example, an enterprise system suitable for embodying the invention claimed herein is described in U.S. patent application Ser. No. 11/053,271, filed Feb. 7, 2005, and titled "Integrated Multi-Media Communication System", which is incorporated herein by reference.

Figure 7:
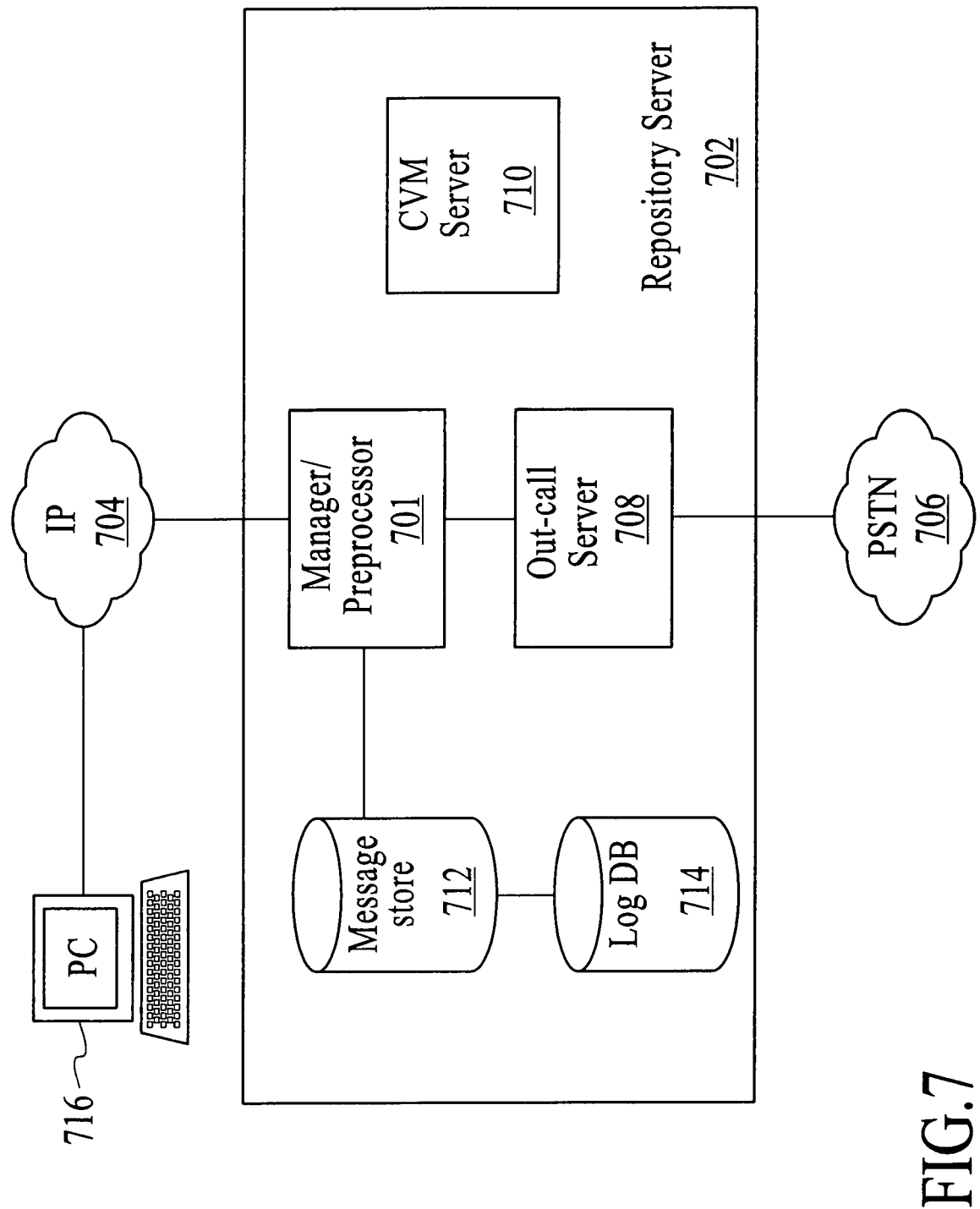
FIG. 7 is a block diagram of a repository server according to an embodiment.

FIG. 7 is a block diagram of a repository server 702 according to an embodiment repository server 702 is coupled to an IP network 704 and a PSTN 706. repository server 702 includes a manager/pre-processor module 701, and out-call server 708, and a CVM server 710. Manager/preprocessor module 701 manages the methods as described herein, including copying emails and email attachments to a message store 712 as previously described. Manager/preprocessor module 701 may perform and/or facilitate some or all of the preprocessing described herein. Preprocessing includes modifying emails as described. Preprocessing further includes obtaining transcriptions of audio files.

Out-call server 708 and CVM server 710 facilitate listening to an audio file and responding via a phone call as previously described herein. In an embodiment, manager/preprocessor module 701 receives a request to listen to an audio file on a recipient phone. Manager/preprocessor module 701 directs out-call server 708 to call the indicated phone number.

When a recipient chooses to send a response voice message via phone, the CVM server 710 forms an email with the response voice message audio file as an attachment. repository server 702, having access to information in the message store 712, such as the email address of the sender, addresses the response email appropriately.

A log store 714 is coupled to message store 712. Log store 714 stores log information regarding the life of a message thread, such as sender information, recipient information, date and time information, related message information, etc. All of the data stored in log store 714 is exportable to another log store. For example, it may be desirable to include log data from the log store 714 in an enterprise email logging system. In various embodiments, the messages in message store 712 are deleted after some period of time. This period of time could be fixed by default, or could be configurable based on characteristics of a particular message (such as sender, etc.). Many other schemes are possible to prevent long term storage of messages that will likely not be accessed in the future. Such schemed include moving particular messages to long-term storage, e.g., because they are required to be kept for a period of years for audit compliance reasons. Similarly, logs in the log store 714 may be configurably deleted or moved to another storage device and/or location.

Manager/preprocessor 701 further stores and authentication key in the message store 712, and sends the authentication key to an email server as previously described. Manager/preprocessor 701 also receives requests from senders or recipients clicking on links that point to a "manager URL". Manager/preprocessor 701 also functions as an intermediary for a person who does not have the full capability to support all the described functionality. For example, manager/preprocessor 701 asks the outcall server to place a call out to PSTN 706 to call a requester's phone in the listen-on-phone scenario.

Figure 8B:
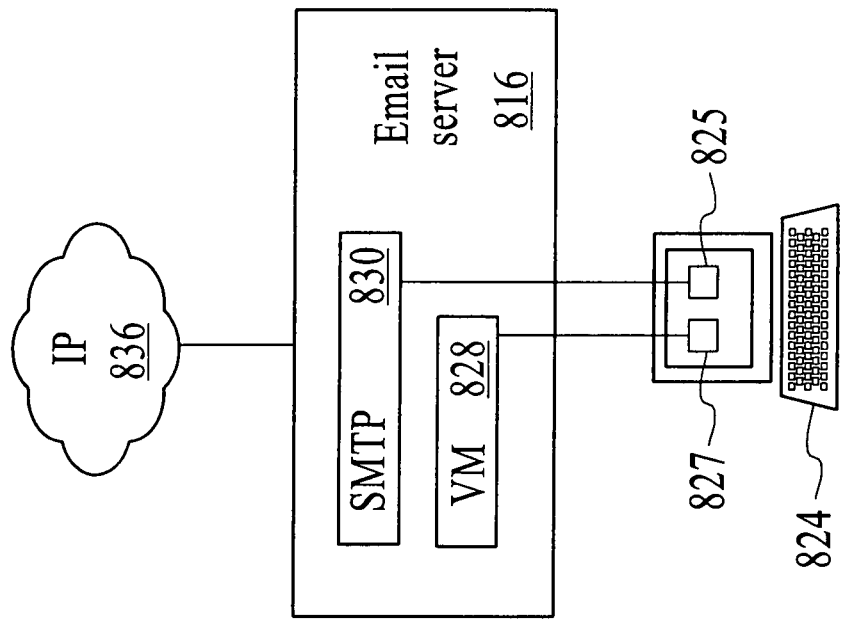
FIG. 8B is a block diagram of an email server according to another embodiment.
Figure 8A:
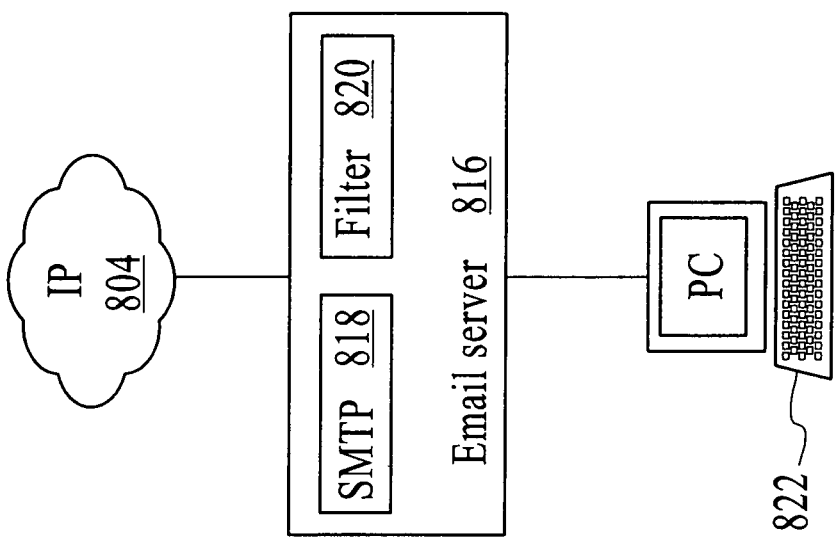
FIG. 8A is a block diagram of an email server according to an embodiment.

FIG. 8A is a block diagram of an email server according to an embodiment. An email server 816 is coupled to a device 822 and an IP network 804. Email server 816 includes a simple mail transfer protocol ("SMTP") agent 818 and a filter 820. In an embodiment, filter 820 is a plug-in filter that is configured to filter emails of a predefined type that are to be handled with the involvement of manager/preprocessor 701. Any email of the predefined type will include the capabilities and functionality described with reference to the flow charts of FIGS. 1-5. For example, actions caused by filtering include preprocessing, storing in the message store, updating the body of a voicemail by inserting relevant information, inserting the authentication key, etc. before the email is sent out.

FIG. 8B is a block diagram of an email server according to an alternative embodiment. An email server 826 is coupled to a device 824 and an IP network 836. Email server 826 includes an SMTP agent 830 and a special voicemail ("VM") process 828 that is invoked from emails that include voice message audio files. A special user interface button 827 calls the special VM process 828, which performs the preprocessing and then calls the SMTP agent 830, which sends the email out. In an embodiment, another user interface button 825 is used for emails that do not require voicemail capability as described herein.

Figure 9:
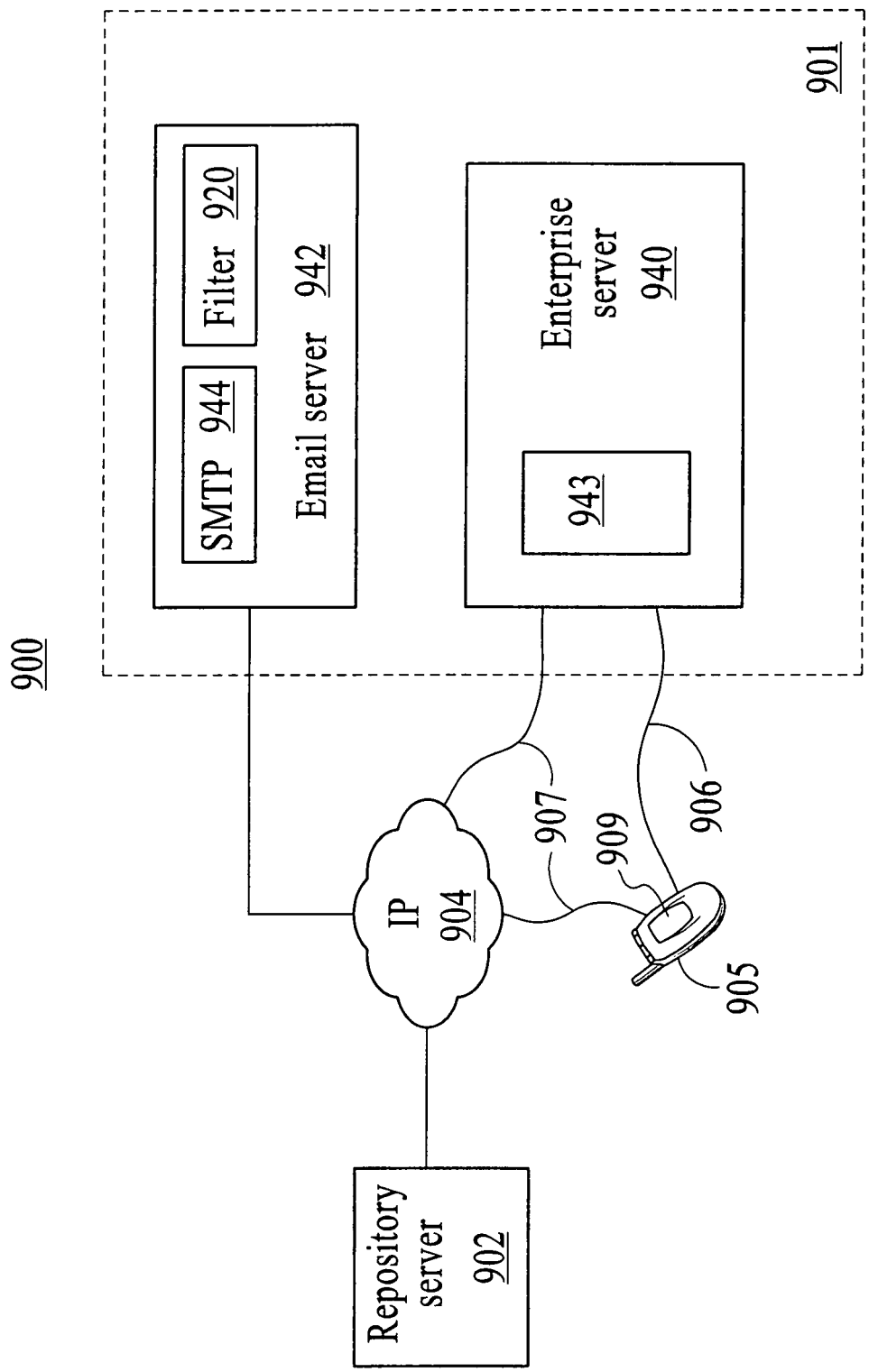
FIG. 9 is a block diagram of a system that includes an enterprise environment, according to an embodiment.

FIG. 9 is a block diagram of a system 900 that includes an enterprise environment 901. As an example, enterprise environment 901 includes a BlackBerry™ enterprise server 940, but other enterprise communication and messaging systems are also applicable. A user email-capable device, such as BlackBerry™ device 905 communicates with the server 940 a secure communication link, or tunnel, as represented by 906. Tunnel 906 is typically not a separate communication mechanism, but rather a secure communication stream using a network such as an IP network, as known in the art. Device 905 can also communicate via IP network 904 and a non-secure communication link 907. Applications can be deployed to device 905 via tunnel 906 over-the-air ("OTA"). In an embodiment, a device plug-in 909 that includes a user interface is deployed to the device 905 for enhancing the user experience with the voicemail and email capabilities described herein.

The server 940 communicates with an enterprise email server 942, which includes an SMTP agent 944. In an embodiment, a filter 920 plugged into SMTP agent 944, and/or a filter 943 plugged into server 940 serve the functions of filter 820 of FIG. 8A. Alternatively, filtering functions are performed on the device 905. A repository server 902 is coupled to IP network 904 and provides all of the functionality described previously with reference to repository servers.

Figure 10:
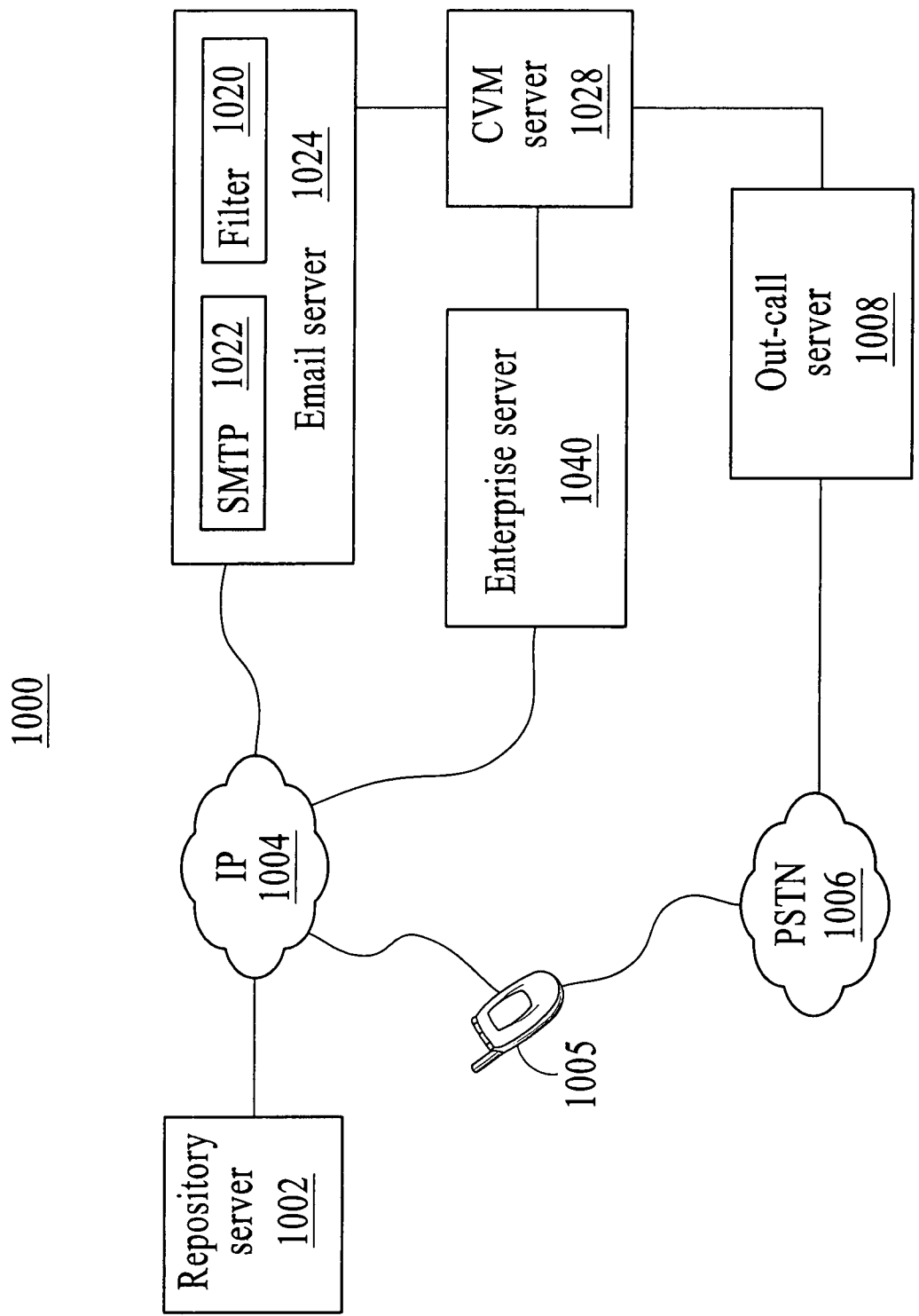
FIG. 10 is block diagram of an alternative embodiment of a unified messaging system.

FIG. 10 is block diagram of a system 1000 illustrating an alternative embodiment of a unified messaging system. System 1000 includes a repository server 1002, an enterprise server 1040, an email server 1024, and a device 1005, all coupled to an IP network 1004. Device 1005, repository server 1002, and an out-call server 1008 are further coupled to a PSTN 1006.

Email server 1024 includes an SMTP agent 1022 and a filter 1020, which are similar to the similarly named elements already described. A create-voice-mail ("CVM") server 1028 is coupled to email server 1024, out-call server 1008, and enterprise server 1040. CVM 1028 facilitates the communication with the device 1005. For example, system 1000 with CVM 1028 facilitates functions described herein for users that cannot record voice messages on their email-capable devices. An example is the method described with reference to FIG. 5. The CVM also communicates with out-call server 1008. The CVM receive a recording of a voice message, and communicates with SMTP agent 1022 or with filter 1020. An email is then sent out including the recorded voice message. In an alternative embodiment (not shown), the CVM runs on an email server.

Figure 11:
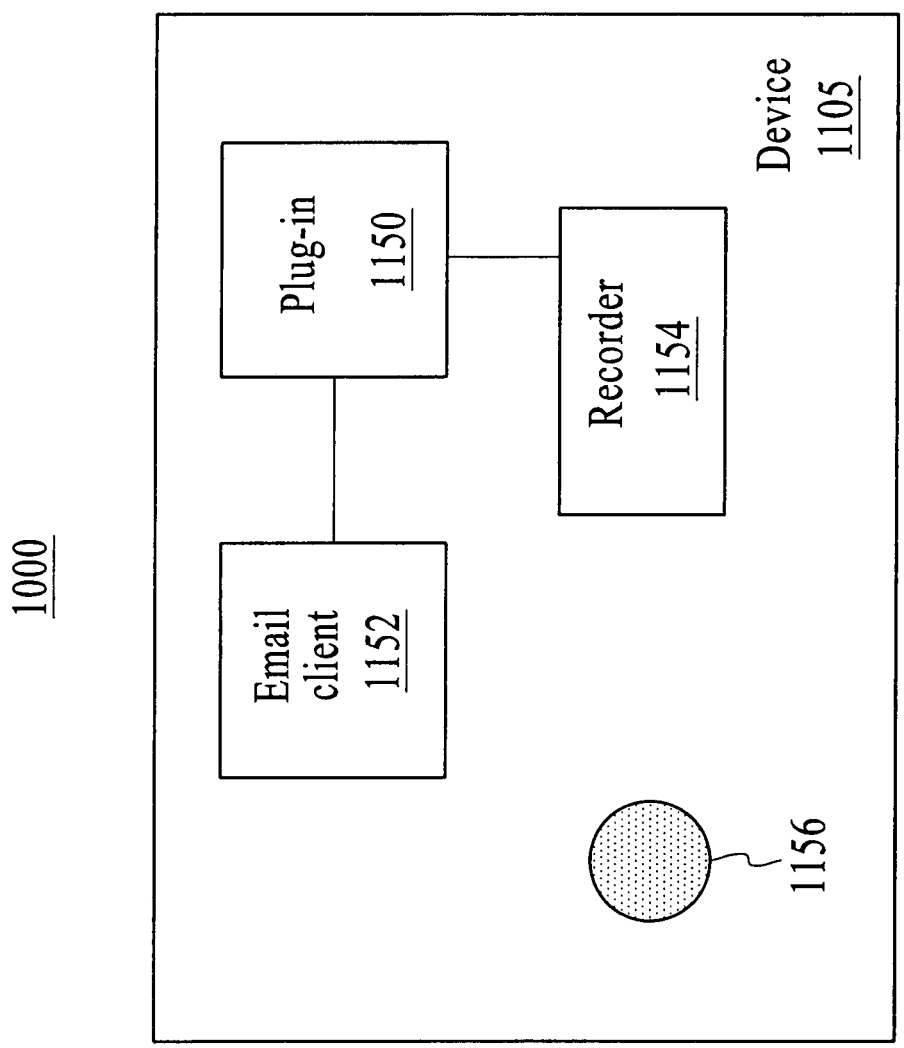
FIG. 11 is a block diagram of an email-capable device, according to an embodiment.

FIG. 11 is a block diagram of an email-capable device 1105, according to an embodiment. Device 1105 includes an email client 1152 and a plug-in 1150. Plug-in 1150 provides an enhanced user experience when the user participates in the methods described herein. For example, plug-in 1150 causes specific buttons to appear on the user interface of device 1105, such as a "play on phone?" button, or a "respond by voice message?" button. As another example, plug-in 1150 enables voice commands related to the unified messaging described herein. In various embodiments, filter functionality as described herein may be partially or completely present in plug-in 1150. Device 1150 further includes a recorder mechanism 1154 and a microphone 1156 for recording sound.

Figure 12A:
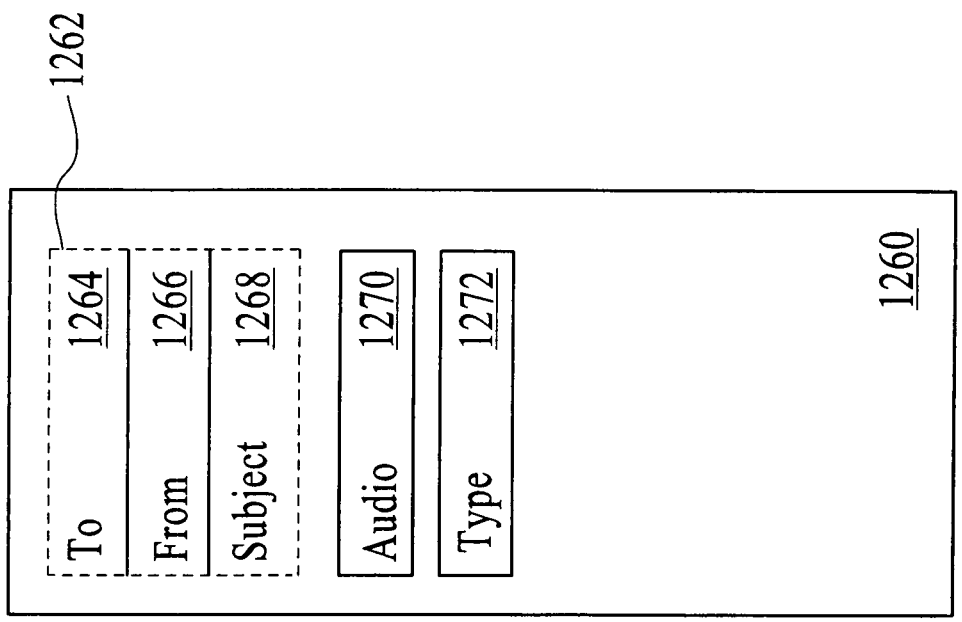
FIG. 12A is a block diagram of a data structure of an email that includes a voice message attached as an audio file, according to an embodiment.

FIG. 12A is a block diagram of a data structure 1260 of an email that includes a voice message attached as an audio file. Data structure 1260 represents only certain aspects of an email after an email has been "combined" with a voice message according to the methods and systems described herein. Data structure 1260 includes an email header 1262 that includes a "to" field 1264, a "from" field 1266, and a "subject" field 1268. An audio attachment 1270 is also part of email data structure 1260. In addition, a "type" 1272 is assigned to indicate that the email includes a voice message. Type 1272 is recognized by a filter as described herein, and causes the email to be handled according to all of the methods described, for example with reference to FIGS. 1-5.

Figure 12B:
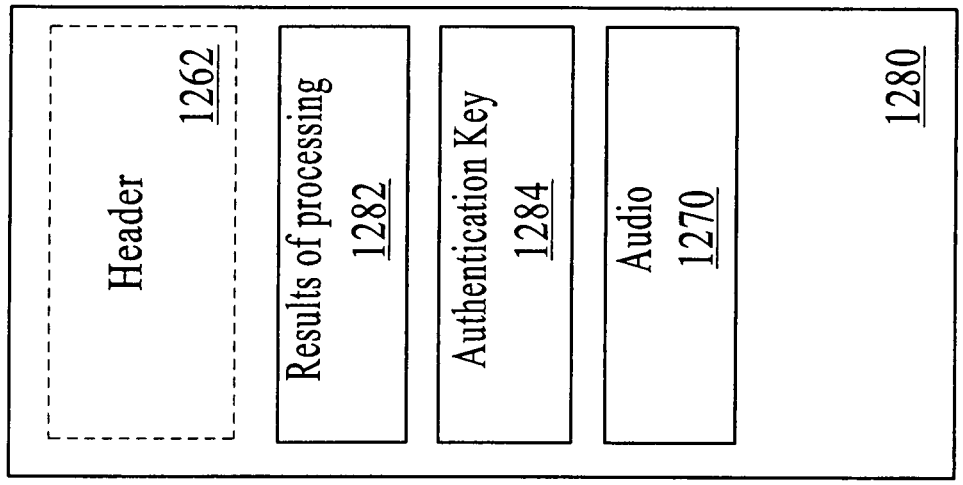
FIG. 12B is a block diagram of a data structure of an email that includes a voice message attached as an audio file after filtering and preprocessing, according to an embodiment.

FIG. 12B is a block diagram of a data structure 1280 of an email that includes a voice message attached as an audio file. Data structure 1280 is an example of an email data structure after filtering and preprocessing as described herein. Data structure 1280 includes header 1262, just as in FIG. 12A. Data structure 1280 also includes results of preprocessing 1282. For example, preprocessing can cause information from a web site, an enterprise user information database, etc. to be included in the email. This included information may be text, links (URLs), Flash applications, etc. Results of preprocessing 1282 also include transcriptions of voice messages, either as body text or as attachments. Data structure 1280 also includes audio attachment 1270.

Data structure 1280 further includes an authentication key 1284 that points to a location of a copy of the email in a message store as described herein. Authentication key 1284 also provides security in that unauthenticated entities requesting access to the email in a message store are denied access. This is useful in systems in which the repository server and message store are located on public, rather than private, networks, although the repository server and all other elements and components described herein could be on a public network or private network Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the unified messaging system and method are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A unified messaging method, comprising:
   a sender email server attaching an audio file to an email message;
   the sender email server forwarding the email message to a repository server, wherein the email message is directed from a sender to a recipient;
   the repository server receiving the email message;
   the repository server storing the email message and the audio file in a message store, wherein the message store is remote from the sender email server and remote from a recipient email server;
   the repository server receiving a request to access the audio file from the recipient email server; and
   the repository server making the audio file available to the recipient by calling the recipient.

2. The method of claim 1, further comprising: associating an authentication key with the email message, wherein the authentication key is a pointer to the audio file; and authenticating the request to access the audio file using the authentication key.

3. The method of claim 1, wherein the audio file comprises a voice message.

4. The method of claim 1, further comprising presenting the sender with a choice to preprocess one or more of the audio file and the email message.

5. The method of claim 1, further comprising preprocessing the audio file, wherein preprocessing comprises performing a transcription of the audio file.

6. The method of claim 1, further comprising preprocessing the email message, wherein preprocessing comprises inserting information in the email, wherein the information is previously indicated by the sender.

7. The method of claim 1, wherein sending the email message comprises sending the email message to an email device of the recipient, and wherein the request to access the audio file comprises a request to listen to the audio file on the email device of the recipient.

8. The method of claim 1, wherein forwarding the email message further comprises sending the email message to an email device of the recipient, and wherein the request to access the audio file comprises a request to listen to the audio file on a phone of the recipient.

9. The method of claim 8, further comprising: receiving a phone number from the recipient; accessing the audio file in the message store using the authentication key; placing the call to the phone number; and playing the audio file during the call.

10. The method of claim 1, wherein forwarding the email message further comprises sending the email message to an email device of the recipient, wherein the recipient does not receive the audio file with the email message, the method further comprising:
receiving a request from the recipient to listen to the audio file on a phone of the recipient;
receiving a phone number from the recipient;
accessing the audio file in the message store using an authentication key;
placing the call to the phone number; and
playing the audio file during the call.

11. The method of claim 1, further comprising: presenting the recipient with a choice to have the audio file transcribed; receiving a request to have the audio file transcribed; inserting a transcription of the audio file into an email message; and sending the email message with the transcription to the recipient.

12. The method of claim 11, wherein inserting comprises one or more of attaching the transcription as a text attachment to the email, and inserting the transcription as a text body of the email.

13. The method of claim 1, further comprising:
presenting the recipient with a choice to respond to content of the audio file by voice;
if the recipient chooses to respond to content of the audio file by voice, receiving a response audio file;
forming a response email including the response audio file; and
sending the response email with the response audio file to the sender.

14. The method of claim 13, further comprising: assigning a response authentication key to the response email message; and storing the response email message, the response audio file, and the response authentication key in the message store.

15. The method of claim 14, wherein the response authentication key is the same as the authentication key.

16. A unified messaging system, comprising:
a network;
a sender email server coupled to the network;
a recipient email server coupled to the network;
a repository server coupled to the network and separate from the sender and recipient email servers, the repository server comprising:
a message store that stores email messages transmitted via either the sender or recipient email server; and
a manager/preprocessor module configurable to store the email messages in the message store, and to associate an authentication key with each of the email messages; and
an out-call server coupled to the manager/preprocessor module and to the network, wherein the out-call server is configured to place a call to a phone number received from a recipient of a selected email message, to access a copy of the selected email message in the message store, including a copy of an audio file attachment to the selected email, and to play the audio file attachment during the call to the recipient.

17. The system of claim 16, wherein the manager/preprocessor module is further configurable to perform preprocessing of the email messages, wherein preprocessing comprises performing a transcription of the audio file attachment.

18. The system of claim 16, further comprising a log store that stores log data regarding the email messages.

19. The system of claim 16, wherein the network is a public switched telephone network (PSTN).

20. The system of claim 19, wherein the manager/preprocessor module accesses the copy of the selected email message using an authentication key obtained from the email.

21. The system of claim 16, further comprising and a create voice mail (CVM) server coupled to the out-call server and configurable to receive a response audio file recorded by a user and to create a response email message including the response audio file.

22. The system of claim 21, wherein the manager/preprocessor module is further configurable to store a copy of the response email message, including the response audio file in the message store, and to send the response email message including the response audio file to a sender of the email message.

23. The system of claim 16, wherein the at least one email server further comprises a filter configurable to recognize an email type, wherein the email type comprises a unified messaging type, wherein a unified messaging type email is handled by the email server as directed by the manager/preprocessor module.

24. The system of claim 23, wherein handling as directed by the manager/preprocessor module comprises transmitting copies of emails to the message store.

25. The system of claim 16, further comprising a user email device coupled to the at least one network and comprising a device plug-in, wherein the device plug-in facilitates sender communication with the repository server, and wherein a user is one or more of a sender of the email messages and a recipient of the email messages.

26. The system of claim 22, wherein the user email device comprises a personal computer.

27. The system of claim 22, wherein the user email device comprises an email-capable handheld device.

28. A non-transitory computer-readable medium having stored thereon instructions that, when executed in a messaging system, cause the system to perform a unified messaging method, the method comprising:

attaching a voice message to an email message, wherein the voice message comprises an audio file;

forwarding the email message to a repository server, wherein the email message is directed from a sender to a recipient, and wherein the repository server is remote from a sender or recipient email server;

receiving the email message at the repository server;

storing a copy of the email message and a copy of the voice message in a message store, wherein the message store is a component of the repository server;

sending the email message from the repository server to a recipient;

receiving a request from the recipient email server to access the audio file;

in response to the request, accessing the copy of the voice message in the message store; and calling a recipient device and playing the voice message on the recipient device.

29. The computer-readable medium of claim 28, wherein the recipient device is a phone.

30. The computer-readable medium of claim 28, wherein the method further comprises assigning an authentication key to the email message, and storing the authentication key with the copy of the email message and a copy of the voice message in the message store.

31. The computer-readable medium of claim 28, wherein the method further comprises authenticating the request using the authentication key.

32. The computer-readable medium of claim 28, wherein the method further comprises presenting the sender with a choice to preprocess one or more of the voice message and the email message.

33. The computer-readable medium of claim 28, wherein the method further comprises preprocessing the voice message, wherein preprocessing comprises performing a transcription of the voice message.

34. The computer-readable medium of claim 28, wherein the method further comprises preprocessing the email message, wherein preprocessing comprises inserting information in the email, wherein the information is previously indicated by the sender.

35. The computer-readable medium of claim 28, wherein sending the email message comprises sending the email message to an email device of the recipient, and wherein the request to access the voice message comprises a request to listen to the voice message on the email device of the recipient.

36. The computer-readable medium of claim 28, wherein sending the email message comprises sending the email message to an email device of the recipient, and wherein the request to access the voice message comprises a request to listen to the voice message on a phone of the recipient.

37. The computer-readable medium of claim 36, the method further comprising: receiving a phone number from the recipient; accessing the voice message in the message store; placing a call to the phone number; and playing the voice message during the call.

38. The computer-readable medium of claim 28, wherein sending the email message comprises sending the email message to an email device of the recipient, wherein the recipient does not receive the voice message with the email message, the method further comprising: receiving a request from the recipient to listen to the voice message on a phone of the recipient; receiving a phone number from the recipient; accessing the voice message in the message store using the authentication key; placing a call to the phone number; and playing the voice message during the call.

39. The computer-readable medium of claim 28, the method further comprising: presenting the recipient with a choice to have the voice message transcribed; receiving a request to have the voice message transcribed; inserting a transcription of the voice message in a an email message; and sending the email message with the transcription to the recipient.

40. The computer-readable medium of claim 39, wherein inserting comprises one or more of attaching the transcription as a text attachment to the email, and inserting the transcription as a text body of the email.

41. The computer-readable medium of claim 28, the method further comprising: presenting the recipient with a choice to respond to content of the voice message by voice; if the recipient chooses to respond to content of the voice message by voice, receiving a response voice message; forming a response email including the response voice message; and sending the response email with the response voice message to the sender.

42. The computer-readable medium of claim 41, the method further comprising: assigning a response authentication key to the response email message; and storing the response email message, the response voice message, and the response authentication key in the message store.

* * * * *

UNITED STATES PATENT AND TRADEMARK OFFICE
CERTIFICATE OF CORRECTION

PATENT NO. : 8,488,751 B2
APPLICATION NO. : 11/801882
DATED : July 16, 2013
INVENTOR(S) : Jens Ulrik Skakkebaek and Cary W. FitzGerald Page 1 of 1

It is certified that error appears in the above-identified patent and that said Letters Patent is hereby corrected as shown below:

Claims

Claim 21, Column 12, Line 33; delete "comprising and a create" and add "comprising a create"

Signed and Sealed this
Fifteenth Day of September, 2015

Michelle K. Lee
*Director of the United States Patent and Trademark Office*